United States Patent [19]

Irving

[11] Patent Number: 5,693,725

[45] Date of Patent: Dec. 2, 1997

[54] CROSSLINKED MANNICH-MICHAEL POLYCONDENSATES

[75] Inventor: Nicholas M. Irving, Mixco, Guatemala

[73] Assignees: Lifesource International, Ltd., Middleton; Jojani, Inc., Newport, both of R.I.

[21] Appl. No.: 521,299

[22] Filed: Aug. 29, 1995

[51] Int. Cl.$^6$ .......................... C08F 283/00; C08G 8/28; C08L 61/34

[52] U.S. Cl. .............. 525/509; 528/86; 528/88; 528/107; 528/113; 528/118; 528/129; 528/220; 528/228; 528/230; 528/254; 528/264; 528/267; 525/480; 525/489; 525/509; 525/521; 525/534; 525/540; 522/6; 522/33; 522/71

[58] Field of Search .................. 528/86, 88, 107, 528/113, 118, 129, 220, 228, 230, 254, 264, 267; 525/480, 489, 509, 521, 534, 540; 522/6, 33, 71

[56] References Cited

U.S. PATENT DOCUMENTS

| | | | |
|---|---|---|---|
| 4,231,759 | 11/1980 | Udelhofen et al. | 44/75 |
| 4,396,517 | 8/1983 | Gemmill, Jr. et al. | 252/51.5 |
| 4,561,901 | 12/1985 | Schilling | 106/277 |
| 4,912,247 | 3/1990 | Roling | 558/306 |
| 5,016,495 | 5/1991 | Takizawa | 74/866 |

*Primary Examiner*—Samuel A. Acquah
*Attorney, Agent, or Firm*—Cesari and McKenna, LLP

[57] ABSTRACT

Novel polymers of general formula:

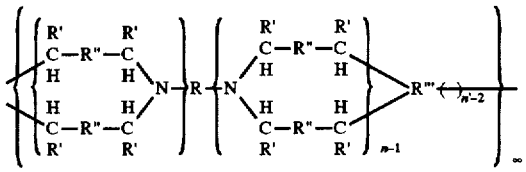

wherein where n is a whole number from 2 to 10; R is a spacing group comprising (a) at least one of m methylene units where m is a whole number from 1 to 20, m' methine units where m' is a whole number from 0 to 20, a mixture of m methylene units and m' methine units where m+m'≤20, and units of formula —($CH_2$-CHX-O)$_{m''}$—, where m" is a whole number from 0 to 200 and X is H, $CH_3$ or $C_2H_5$, or (b) an aromatic ring having one, two or three members; R' is H, an alkyl group having no more than 20 carbon atoms, an aryl group having no more than three rings, or a combination thereof; R" is a group containing at least two active hydrogen atoms and having at least two but no more than 20 carbon atoms; and R'" is a group containing at least two active hydrogen atoms and is selected from the group consisting of alkyl, aryl and mixed alkyl-aryl species having from 1 to 200 carbon atoms; polyalkylene oxides; and urea formaldehyde resin.

22 Claims, No Drawings

CROSSLINKED MANNICH-MICHAEL POLYCONDENSATES

BACKGROUND OF THE INVENTION

1. Field of the Invention

This invention relates generally to new and useful chemical compounds, and more particularly to monomers prepared via the Mannich reaction which in turn can react with suitable comonomers to form crosslinked polymers by a Michael-type reaction.

2. Description of the Related Art

Although relatively few families of polymer systems involve the amine group as a functional component, such functionality leads to networks with fairly high cohesive energy density. This parameter indicates the extent of intermolecular attraction among the macromolecules, and involves van der Waals forces, bond polarity, hydrogen bonds, and ultimately crosslinked covalent bonds. For example, polyamides (either aliphatic or aromatic), which represent the reaction product of dicarboxylic acids and diamines, exhibit substantial hydrogen bonding. Another example is given by the epoxy resin systems, where a prepolymer containing an oxirane group reacts with an amine-containing prepolymer to form highly cohesive crosslinked polymers. Polyurethane/polyurea systems represent a further example. In these systems, isocyanate groups react with methylol moieties to form urethane bonds but can also become hydrolized to amines, which react with unmodified isocyanate groups to form urea bonds. Isocyanate groups can also react directly with amines to form all-urea polymers having very high cohesive energy densities.

The Mannich reaction provides a synthetic route to production of amine derivatives from materials containing active hydrogen atoms. An amine compound (i.e., ammonia or a primary or secondary amine) is reacted under mild acid or alkaline conditions with formaldehyde and a compound (often a ketone) that contains at least one active hydrogen atom to form the substituted amine derivative, with the active hydrogen atom replaced by a methylene group (derived from formaldehyde) which is also bound to the nitrogen atom. The Mannich reaction has also been used to generate oligomers and polymers by combining two moles of formaldehyde for every mole of active-hydrogen compound and ammonia or primary amine. See, e.g., Tsuchida & Hasegawa, 14 Polym. Lett. Edn. 103 (1976). Other examples of linear Mannich polymers appear in U.S. Pat. Nos. 4,231,759; 4,396,517; 4,561,901; 4,912,247; and 5,016,495.

Unfortunately, these uses of the Mannich pathway are linear, lacking sufficient cohesive energy density to be of practical value for most uses. Indeed, such preparations cannot be characterized as "high polymers" at all, and instead are best described as oligomers. Their structures follow the pattern of an uncrosslinkable thermoplastic, exhibiting low cohesive energy; finite, measurable molecular weight; solubility; fluidity; and fusibility. They would therefore fail in any industrial application requiring the mechanical properties (such as durability, hardness and insolubility) obtainable only with crosslinked systems.

DESCRIPTION OF THE INVENTION

Brief Summary of the Invention

The present invention utilizes the Mannich pathway to generate multifunctional monomers that may be crosslinked into structures that exhibit all of the mechanical and physical properties associated with commercial cross-linked systems. These monomers contain reactive methylol groups capable of interacting, in situ, with active-hydrogen compounds via the Michael reaction. Crosslinked polymer networks are efficiently and straightforwardly obtained when the active-hydrogen compounds are multifunctional, in which case they act as comonomers. The result is a class of thermosetting polymers exhibiting very high cohesive energy densities.

Generally, the approach of the invention is to combine a multifunctional Mannich monomer containing reactive methylol groups (which may undergo dehydration to form unsaturated sites) with a suitable active-hydrogen compound, then exposing the mixture to conditions that trigger reaction (e.g., acidic or basic pH levels, heat/high temperature, catalysts, pressure or actinic radiation of infrared, ultraviolet or microwave wavelengths) in order to form crosslinked structures. The approach of the present invention is highly versatile since the basic monomer can be prepared in many different variations. Furthermore, the monomer can be copolymerized with a virtually limitless variety of multifunctional active-hydrogen compounds, particularly those containing primary or secondary amine groups.

The preferred implementations of the present invention are easily practiced, as most of the components are handled in liquid form. Moreover, in contrast to many other thermosetting systems, the ingredients are not very hazardous; preparation of polyurethanes and polyureas, for example, involves handling of dangerous and reactive isocyanates.

The present invention is to be contrasted with that disclosed in copending application Ser. No. 08/375,854, filed on Jan. 20, 1995, which involves crosslinking via the Mannich reaction. The present invention polymerizes and crosslinks via a Michael-type reaction, and the essence of the mechanism is a copolymerization. Accordingly, the structure of the final polymer is more complex and involves two reacted monomers. Furthermore, the monomers disclosed in the '854 application condense via active hydrogen atoms, rendering them vulnerable to premature polymerization. The monomers of the present invention, by contrast, condense exclusively by means of reactive methylol groups, and exhibit substantial stability. The present invention also offers considerable additional versatility in terms of molecular architecture.

The polymer system of the present invention utilizes Mannich-derived methylol-bearing monomers that undergo extensive crosslinking or curing upon consecutive reaction with multifunctional active-hydrogen comonomers (particularly primary or, less preferably, secondary amines, as well as amides, urea, diols, polyols, thiols, ketones and phenols) and are described by the following formula F1:

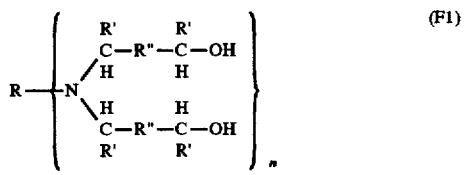

where n is a whole number from 2 to 10 and R is a spacing group that bears the reactive moiety in braces. In one embodiment, R comprises methylene units $-(CH_2)_m-$, where m is a whole number from 1 to 20. In this embodiment R can also contain methine units $-(CH)_{m'}-$ interspersed with or clustered within the methylene units, where m' is a whole number from 0 to 20 and $m+m' \leq 20$. In another embodiment, R has the structure —(CH$_2$-CHX-O)$_{m''}$—, where m" is a whole number from 0 to 200, and X can be H, CH$_3$ or C$_2$H$_5$. Alternatively, R can be an aromatic ring having One, two or three members, with or without heteroatoms.

R' is H or an alkyl, aryl or mixed alkyl-aryl species. Preferably, in the case of alkyl compounds, the total chain length of the R' component is between 1 and 20 carbon atoms, and most preferably contains 12 or fewer carbon atoms. Useful aryl compounds include aromatic rings having one, two or three members (e.g., phenyl).

R" includes at least two active hydrogen atoms (as determined by the Zerewitinoff test with methylmagnesium bromide). R" contains a stabilizing group (i.e., a group containing a double or triple covalent bond) such as carbonyl, phenyl, phenol, acetylene nitrile, nitrate, nitro, sulfonyl, sulfoxide, in position beta to the methylol group. Preferred active-hydrogen compounds (of formula HR"H) include alkyl, aryl and mixed alkyl-aryl species. The HR"H component can be as simple as acetone. Preferably, in the case of alkyl compounds, the total chain length of the R" component is between 2 and 20 carbon atoms, and most preferably contains 12 or less carbon atoms; the total chain length alkyl R" compounds can range from 1 to 25 carbon atoms. Useful aryl compounds for the HR"H species include aromatic rings having one, two or three members. For example, a useful family of compounds has the chemical formula H$_3$C-CO-Ar-CO-CH$_3$, where Ar is substituted or unsubstituted benzene, naphthalene or anthracene. The most important criterion for the R" compound is reaction with an aldehyde to form a methylol group with the unsaturation beta thereto.

The methylol group in the monomer can be present as such or partially replaced by unsaturation resulting from dehydration:

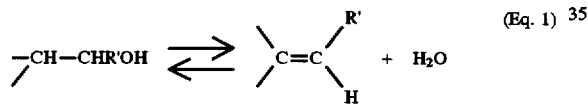

(Eq. 1)

The monomer of formula F1 is preferably formed in two basic steps, the first involving an amine of general formula R(NH$_2$)$_n$ (with R as defined above) and an equivalent amount, per amine group, of aldehyde R'CHO (preferably, although not necessarily formaldehyde) and active-hydrogen compound HR"H. The reaction takes place under moderate temperatures and mild pH conditions, either acidic or basic, to produce an intermediate of the following formula F2:

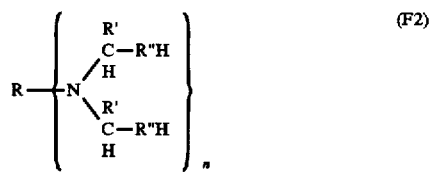

(F2)

with the various constituents defined as above. In a subsequent step, a second equimolar amount of aldehyde is added without change in reaction conditions. The process is monitored chromatographically (e.g., by high-pressure liquid chromatography, gel-permeation or size-exclusion chromatography, gas chromatography, thin-layer chromatography, or other suitable technique) until the monomer of formula F1 is obtained. This monomer may have some participation in the equilibrium of Eq. 1.

Alternatively, the monomer can be synthesized in a single step by selecting co-reactive ingredients for combination, as illustrated in Example 2 below.

Polymerization and crosslinking of the synthesized monomer can be brought about by means of a Michael-type reaction involving the monomer's methylol groups with multifunctional active-hydrogen compounds of general formula R'"(H)$_{n'}$, where (H) is an active hydrogen atom, n' is a whole number from 2 to 10 and R'" is a spacing group chosen from alkyl, aryl and mixed alkyl-aryl species having from 1 to 200 carbon atoms (e.g., small molecules such as urea, ethylenediamine or ethylene glycol, or larger molecules having more carbon atoms but preferably not more than 10 active hydrogen atoms); polyalkylene oxides having molecular weights from 200 to up to 5000 (e.g., di- or trifunctional Jeffamines, the difunctional versions having the typical formula H$_2$N-CH(CH$_3$)-[O-CH$_2$-CH(CH$_3$)]$_n$-NH$_2$); or urea formaldeyde resin having a molecular weight ranging from 250 to 1000.

Crosslinking occurs over a range of stoichiometries. Best results are generally obtained when a single methylol terminal reacts with an equivalent of active hydrogen. However, it is possible to selectively vary the stoichiometry to augment the degree of hydrogen bonding (e.g., by adding additional active-hydrogen material to preserve at least some of the polar hydrogen atoms).

The process can be promoted by a number of external factors, e.g., pH-control agents or catalysts in the form of Bronsted or Lewis acids or bases, the addition of heat, or application of actinic radiation in the microwave, infrared or ultraviolet spectral regions.

The basic polymerization reaction involves the unsaturated equilibrium species of Eq. 1, which, owing to its proximity to the stabilizing group, forms a species (e.g., an α,β-unsaturated system where the stabilizing group is a carbonyl) vulnerable to nucleophilic conjugate addition as follows:

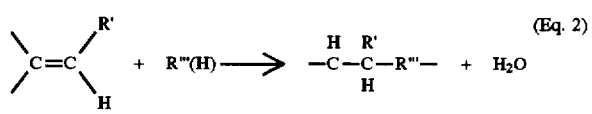

(Eq. 2)

Because the species R'"(H) contains a plurality of active hydrogen atoms, catenation occurs to form a crosslinked polymer of general formula F3:

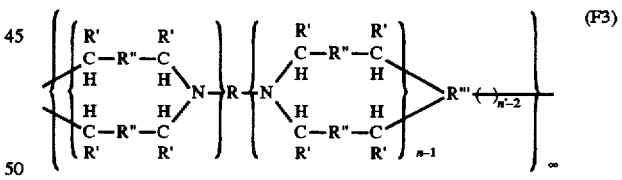

(F3)

where the parentheses following R'" indicate additional crosslinking bonds to R'CH groups and the infinity symbol denotes an undefined and very large number.

The foregoing pattern can be designed over a very broad range of compositions by appropriate selection of substituents found in various amines, aldehydes and other active-hydrogen compounds. It is therefore possible to obtain many different products each with particular (and selectable) bulk properties.

DETAILED DESCRIPTION OF THE PREFERRED EMBODIMENTS

The central constituent precursor of the monomer of formula F1 is an amine of general formula R(NH$_2$)$_n$ as discussed previously. Two primary amine end groups are preferred, and it is also advantageous to have additional amine (NH) groups within the R group. If R is an aromatic species, it is possible to have up to three primary amine groups on a ring, as in, for example, melamine and certain amine-terminated polyalkylene oxides such as the T-Series of Jeffamines (supplied by Texaco Chemical). As a general rule, the higher the functionality of the amines, the higher the crosslink density of the resulting polymer can be, since each R group can bear more reactive sites. Among the preferred amines are ethylene diamine, propylenediamine, butylenediamine, hexamethylenediamine, melamine, methylenedianiline, diethylenetriamine and diaminotoluene, although advantageous results can be expected with virtually any other di- or triamine, whether aliphatic or aromatic, as well as with multiamine-terminated polyalkylene oxides (such as the Jeffamines noted above), mixtures such as ethyleneamine E-100 (supplied by Dow Chemical) and other $NH_2$-containing molecules such as hydrazine and its derivatives.

Amines containing aromatic groups are selected where a stiff polymer is desired, whereas aliphatic amines yield softer thermosets. To obtain a certain target degree of elasticity, it is preferred to utilize polyalkylene amines, since these are readily available in a variety of average chain lengths.

Formaldehyde is the preferred aldehyde, and can be used in any suitable form (i.e., formalin, formaldehyde gas, trioxane or paraformaldehyde). However, other aldehydes, including acetaldehyde, furfural, crotonaldehyde and benzaldehyde can be employed as well. The bulk properties of the end product can be designed by judicious selection of reagents and their substituents, which is well within the purview of those skilled in the art.

Suitable active-hydrogen compounds include ketones with alpha protons (e.g., acetone, butanone, cyclohexanone, methylisobutyl ketone or acetylacetone); phenol and its derivatives; amines and ureas; dinitro, dinitrate and dinitrile compounds; glycols and multifunctional alcohols (e.g., ethylene glycol, propylene glycol or glycerol); dithiols; diesters; acetylene and diacetylenes; dicarboxylic acids; sulfoxides; and multifunctional benzylpyridines. These compounds can be used alone or in combination as reaction with the aldehyde forms a methylol group with the stabilizing group beta thereto.

Once a particular monomer of formula F1 is obtained, it is polymerized by selection of the active-hydrogen compound $R'''(H)_n$ (which acts as a comonomer). This compound must therefore be multifunctional and is preferably a primary or, less preferably, a secondary amine and/or one or more amides, urea, diols, polyols, thiols, ketones or phenols. Suitable materials for the $R'''(H)_n$, component include the active-hydrogen compounds enumerated above, as well as the amines listed above for the $R(NH_2)_n$ component.

Preferred materials contain the $NH_2$ group, although compounds containing urea, thiol, hydroxyl and/or phenol groups can also be used with advantage. Maximum crosslinking efficiency is obtained when the methylol groups in the monomer are allowed to react with the comonomer's active hydrogen atoms on an equimolar basis. However, the present polymer system exhibits a fairly good degree of flexibility in terms of stoichiometric balance, and forms networks with good crosslink density despite some deviation from equimolar proportions. For example, as noted earlier, the proportion of $R'''$ can be varied to force a greater degree of hydrogen bonding. This is exemplified in the case of urea used as $R'''$. Since urea contains four active hydrogen atoms, use of one mole of urea for every four moles of available methylol will result in complete crosslinking, with the four hydrogen atoms of each urea molecule being replaced by four separate polymer linkages. By doubling the proportion of urea, however, the bound urea molecules will retain, on average, two hydrogen atoms that can participate in hydrogen bonding.

Polymerization takes place under suitable conditions of pH, catalysis, heat/temperature, pressure or actinic radiation (microwave, infrared or ultraviolet). Curing conditions under basic pH are preferred, and crosslinking can take place at room temperature in a convenient manner. The system can also be activated by elevated temperatures, and is also responsive to Lewis catalysts.

The prepolymer system can be used to form composite materials by combination with appropriate fillers and/or fibers. Suitable fillers include silica gel, calcium carbonate, cellulose flock, carbon black, titanium dioxide, talcum, mica or clay, preferably in particle sizes as small as practicably obtainable. Suitable fibers include glass, cellulose and its derivatives, polyolefins, carbon, borosilicates and polyamides (aromatic or aliphatic). Cellulosic fillers and fibers are particularly compatible with the present invention given their richness in primary OH groups.

The following examples are only illustrative of preferred embodiments of this invention, which utilize the single-monomer approach, and are not intended to limit the scope thereof. All proportions referred to herein and in the appended claims are by weight, all amounts in terms of mass or volume (as indicated) and all temperatures are in °C., unless otherwise indicated.

EXAMPLE 1

This example illustrates preparation of a monomer in accordance with formula F1. In a flask containing 20 mL ethylenediamine, 36 g paraformaldehyde were added 0.5 hour under agitation and external cooling. After 1 hour, 95 mL acetone were introduced along with 1 mL 3.7M ammonium chloride and the mixture refluxed for 4 hours, after which an additional 36 g paraformaldehyde were added and reflux extended for an additional 3.5 hours. An orange, fluid, sticky product was obtained.

EXAMPLE 2

A monomer in accordance with formula F1 is obtained in a single step as follows. Four mol acetone and 8 mol paraformaldehyde are mixed together while 1 mol ethylenediamine (containing $NH_4Cl$) is added slowly under cooling. The mixture is refluxed for approximately 4 hours to yield a monomer having the chemical formula:

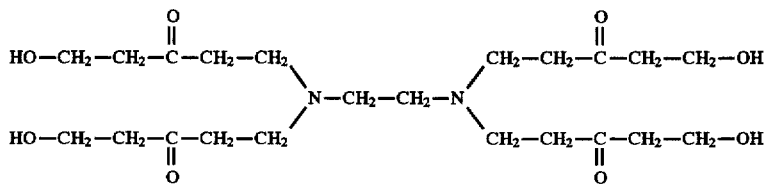

EXAMPLE 3

A 13.3 g sample of the monomer prepared according to Example 1 was mixed with 2.1 g diethylenetriamine. A 5 g sample of the resulting solution was mixed with 0.1 mL of 25% aqueous NaOH. A tough, clear polymer was obtained.

EXAMPLE 4

A 13.3 sample of the monomer prepared according to Example 1 was mixed with 14.7 g Jeffamine T-403 (supplied by Texaco Chemical). A 5 g sample of the resulting mixture was combined with 0.1 mL of 25% aqueous NaOH. A tough, opaque polymer was obtained.

EXAMPLE 5

A different form of monomer was obtained by following the procedures of Example 1 but replacing the acetone with 113 g phenol, which was added slowly under external cooling. A very thick product was obtained. 9.6 g of this product was mixed with 10 mL acetone to form a solution, which was then mixed with 9.1 g of the product from Example 1. Acetone was allowed to evaporate, and 0.9 mL of 25% aqueous NaOH was added, keeping the mixture warm for about 0.5 hour thereafter. A hard, brittle polymer was obtained.

EXAMPLE 6

Another form of monomer was obtained by dissolving a mixture of 10 mL hexamethylenediamine and 10 mL ethylenediamine in 85 mL butanone, and under agitation and external cooling 66 mL formalin containing 2 mL of 3.7M ammonium chloride were added over 45 min. Then a second portion of 66 mL formalin was added and the mixture refluxed for 6 hours. An orange solution was obtained, of which 12.5 g were mixed with 1 g melamine and heated to form a solution. 0.68 g of 25% aqueous NaOH were then added to this solution. An aqueous layer was separated as polymerization took place.

EXAMPLE 7

To a flask containing 40 mL ethylenediamine and 2 mL of 3.7M ammonium chloride were added, over 1 hour under agitation and cooling, a 72 g portion of paraformaldehyde. To this were added 175 ml acetone and the mixture was refluxed for 6 hours. A 10 g sample of this product was mixed with a 13 g sample of the monomer from Example 1, and 5 g of this mixture were blended with 0.1 mL of 25% aqueous NaOH. A rubbery, translucent polymer was obtained.

EXAMPLE 8

A mixture of 13.3 g of the monomer from Example 1 and a solution of 3 g urea in 3 mL water was prepared, and 7.5 g of the mixture combined with 0.15 mL of 25% aqueous NaOH. A tough, insoluble and reddish polymer was obtained.

EXAMPLE 9

A 13.3 g sample of the monomer from Example 1 was mixed with 3.1 g glycerine and 0.82 mL of 25% aqueous NaOH. An orange, opaque, tough polymer was obtained.

EXAMPLE 10

The preparation outlined in Example 3 was repeated, and a 5 g sample of the catalyzed mixture applied on a small square of kenaf fabric. A second 5 g sample of a similar mixture was first blended with 0.5 g of alfa flock and then applied on kenaf. The cured laminates had good appearance, and the filled sample exhibited a stiffer feel.

EXAMPLE 11

The monomer produced in Example 2 can be modified for enhanced reactivity with commercial urea-formaldehyde resins under acidic conditions. The monomer is combined with four moles of urea so that the nitrogen-bound functional groups undergo the following reaction:

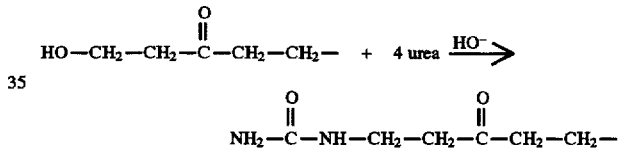

This reaction was carried out by combining 10 g of the monomer from Example 2 with 4.1 g of urea, and allowing this solution to react in the presence of 0.1 mL of a 50% NaOH solution (aq) for 2 hours at room temperature under agitation. The NaOH was neutralized with $H_3PO_4$.

EXAMPLE 12

The monomer produced in Examples 1 and 2 can also be obtained by combining dimethylolacetone with ethylenediamine as follows. In 500 mL flask, 150 mL acetone and 300 mL formalin were mixed with 3 g sodium carbonate to produce the dimethylolacetone intermediate. The temperature was brought just to 65° C. and the system allowed to cool slowly. After 2 hours, 34 mL ethylenediamine were added dropwise under agitation and external cooling over 1 hour. Stirring continued for an additional hour at 65° C., following which 4 g $NH_4Cl$ and then 61.5 g urea were dissolved in the product.

Thus, it will be seen that I have provided a novel and versatile family of polymer materials that can be easily stored and transported, and cured under convenient conditions. The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A crosslinked polymer of formula:

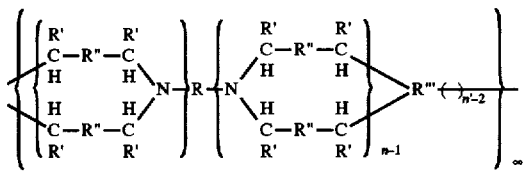

wherein where n is a whole number from 2 to 10; R is a spacing group comprising (a) at least one of m methylene units where m is a whole number from 1 to 20, m' methine units where m' is a whole number from 0 to 20, a mixture of m methylene units and m' methine units where m+m'≦20, and units of formula —(CH$_2$-CHX-O)$_{m''}$—, where m" is a whole number from 0 to 200 and X is H, CH$_3$ or C$_2$H$_5$, or (b) an aromatic ring having one, two or three members; R' is H, an alkyl group having no more than 20 carbon atoms, an aryl group having no more than three rings, or a combination thereof; R" is a group containing at least two active hydrogen atoms and having at least two but no more than carbon atoms; and R'" is a group containing at least two active hydrogen atoms and is selected from the group consisting of alkyl, aryl and mixed alkyl-aryl species having from 1 to 200 carbon atoms; polyalkylene oxides; and urea formaldehyde resin.

2. The polymer of claim 1 wherein R' contains no more than 12 carbon atoms.

3. The polymer of claim 1 wherein R" contains a double or triple bond located beta to the carbon bonded to R'".

4. The polymer of claim 3 wherein R" comprises a functional group selected from the group consisting of carbonyl, phenyl, phenol, acetylene nitrile, nitrate, nitro, sulfonyl and sulfoxide.

5. The polymer of claim 1 wherein R" contains no more than 12 carbon atoms.

6. The polymer of claim 1 wherein R" has the chemical formula H$_3$C-CO-Ar-CO-CH$_3$, where Ar is selected from the group consisting of benzene, naphthalene, and anthracene coupounds.

7. The polymer of claim 1 wherein R'"is selected from the group consisting of urea, ethylenediamine and ethylene glycol.

8. The polymer of claim 1 wherein R'" is an alkyl, aryl or mixed alkyl-aryl species having from 1 to 200 carbon atoms.

9. The polymer of claim 1 wherein R'" is a polyalkylene oxide having a molecular weight of at least 200 but no more than 5000.

10. The polymer of claim 1 wherein R'" is a urea formaldehyde resin having a molecular weight of at least 250 but no more than 1000.

11. A reactive monomer of formula:

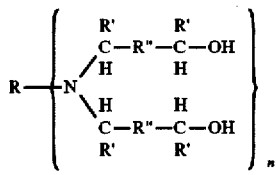

wherein where n is a whole number from 2 to 10; R is a spacing group comprising (a) at least one of m methylene units where m is a whole number from 1 to 20, m' methine units where m' is a whole number from 0 to 20, a mixture of m methylene units and m' methine units where m+m'≦20, and units of formula —(CH$_2$-CHX-O)$_{m''}$—, where m" is a whole number from 0 to 200 and X is H, CH$_3$ or C$_2$H$_5$, or (b) an aromatic ring having one, two or three members; R' is H, an alkyl group having no more than 20 carbon atoms, an aryl group having no more than three rings, or a combination thereof; and R" is a group containing at least two active hydrogen atoms and having at least two but no more than 20 carbon atoms and comprising a double or triple bond located beta to the methylol group.

12. The polymer of claim 11 wherein R' contains no more than 12 carbon atoms.

13. The polymer of claim 12 wherein R" comprises a functional group selected from carbonyl, phenyl, phenol, acetylene nitrile, nitrate, nitro, sulfonyl and sulfoxide.

14. The polymer of claim 11 wherein R" contains no more than 12 carbon atoms.

15. The polymer of claim 10 wherein R" has the chemical formula H$_3$C-CO-Ar=CO-CH$_3$, where Ar is selected from the group consisting of benzene, naphthalene, and anthracene compounds.

16. A method of synthesizing a polymer, the method comprising the steps of:

a. providing a monomer of formula:

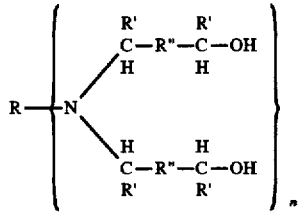

wherein where n is a whole number from 2 to 10; R is a spacing group comprising (a) at least one of m methylene units where m is a whole number from 1 to 20, m' methine units where m' is a whole number from 0 to 20, a mixture of m methylene units and m' methine units where m+m'≦20, and units of formula —(CH$_2$-CHX-O)$_{m''}$—, where m" is a whole number from 0 to 200 and X is H, CH$_3$ or C$_2$H$_5$, or (b) an aromatic ring having one, two or three members; R' is H, an alkyl group having no more than 20 carbon atoms, an aryl group having no more than three rings, or a combination thereof; and R" is a group containing at least two active hydrogen atoms and having at least two but no more than 20 carbon atoms and comprising a double or triple bond located beta to the methylol group;

b. reacting the monomer with a compound of formula R'"(H)$_{n'}$, where (H) is an active hydrogen atom, n' is a whole number from 2 to 10 and R'" is a group containing at least two active hydrogen atoms and is selected from the group consisting of alkyl, aryl and mixed alkyl-aryl species having from 1 to 200 carbon atoms; polyalkylene oxides; and urea formaldehyde resin.

17. The method of claim 16 wherein the reacting step comprises addition of a Bronsted or Lewis acid or base.

18. The method of claim 16 wherein the reacting step is triggered by addition of heat.

19. The method of claim 16 wherein the reacting step is triggered by application of actinic radiation.

20. The method of claim 16 wherein the monomer has a number of methylol groups and the compound of formula $R'''(H)_n$, has a number of active hydrogen atoms and further comprising the step of utilizing, in the reacting step, respective proportions of the monomer and $R'''(H)_n$, to render the number of methylol groups equal to the number of active hydrogen atoms.

21. The method of claim 16 wherein the monomer has a number of methylol groups and the compound of formula $R'''(H)_n$, has a number of active hydrogen atoms and reacts to form hydrogen bonds, and further comprising the step of utilizing, in the reacting step, respective proportions of the monomer and $R'''(H)_n$, to produce fewer methylol groups than active hydrogen atoms.

22. The method of claim 16 further comprising the step of reacting the monomer with urea and acetone.

* * * * *